United States Patent [19]

Grube et al.

[11] Patent Number: 5,535,431
[45] Date of Patent: Jul. 9, 1996

[54] METHOD OF DETECTING UNAUTHORIZED USE OF A COMMUNICATION UNIT

[76] Inventors: Gary W. Grube, 157 Cedarwood Ct., Palatine, Ill. 60067; Timothy W. Markison, 555 Northview La., Hoffman Estates, Ill. 60194

[21] Appl. No.: 222,986

[22] Filed: Apr. 5, 1994

[51] Int. Cl.⁶ .................................................. H04B 7/00
[52] U.S. Cl. ...................... 455/54.1; 455/33.1; 455/53.1; 455/54.2; 455/58.2; 380/23; 379/60; 379/62
[58] Field of Search ................................ 455/54.1, 33.1, 455/54.2, 56.1, 58.2, 53.1, 67.1; 379/58, 59, 62, 60; 380/23

[56] References Cited

U.S. PATENT DOCUMENTS

| | | | |
|---|---|---|---|
| 5,235,633 | 8/1993 | Dennison et al. | 379/60 |
| 5,243,652 | 9/1993 | Teare et al. | 380/23 |
| 5,335,265 | 8/1994 | Cooper et al. | 455/33.1 |
| 5,345,595 | 9/1994 | Johnson et al. | 455/33.1 |

Primary Examiner—Reinhard J. Eisenzopf
Assistant Examiner—Doris To
Attorney, Agent, or Firm—Timothy W. Markison; Christopher P. Moreno

[57] ABSTRACT

Unauthorized use of a communication unit 102 in a wireless communication system 100 may be prevented by determining the location of the communication unit 102 each time it transmits an affiliation request or a service request. Knowing the location of the communication unit 102, the controller 101 can determine whether the location of the unit fits within a historical location pattern for that unit. If the location does not fit within the pattern, the controller 101 can deny the request or send an indication to a system manager 110 asking the system manager 110 to decide what should be done with this unit.

9 Claims, 3 Drawing Sheets

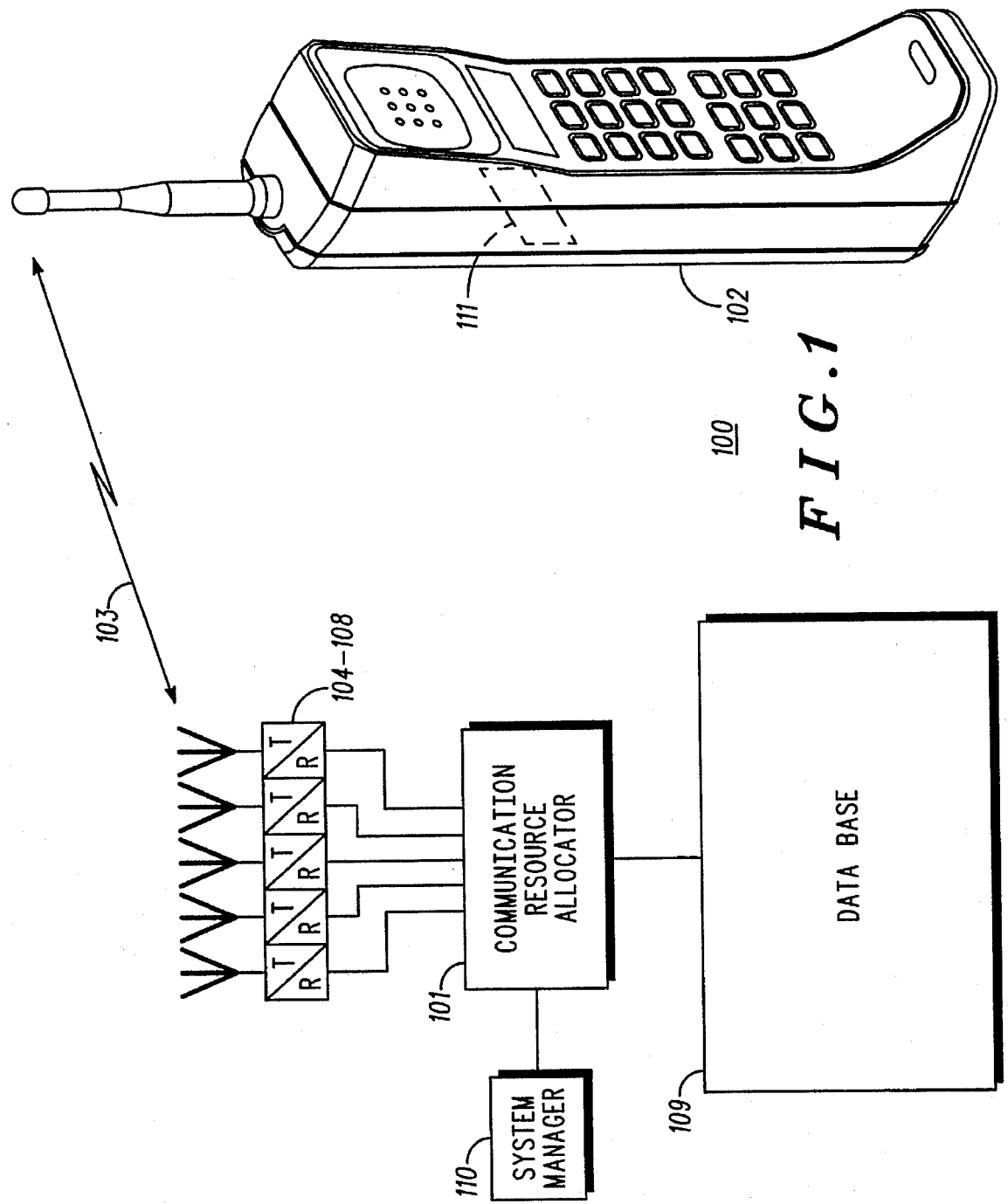

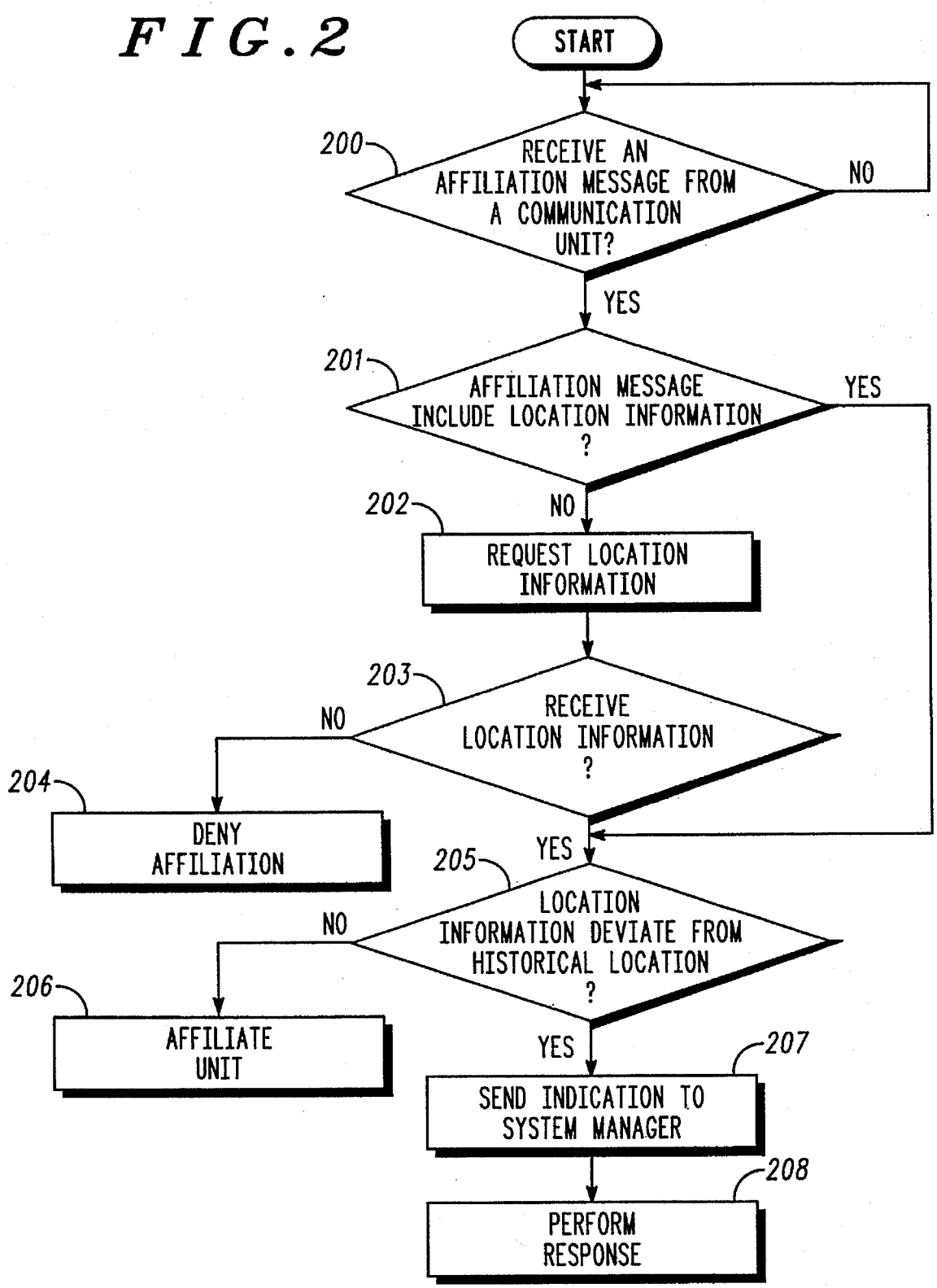

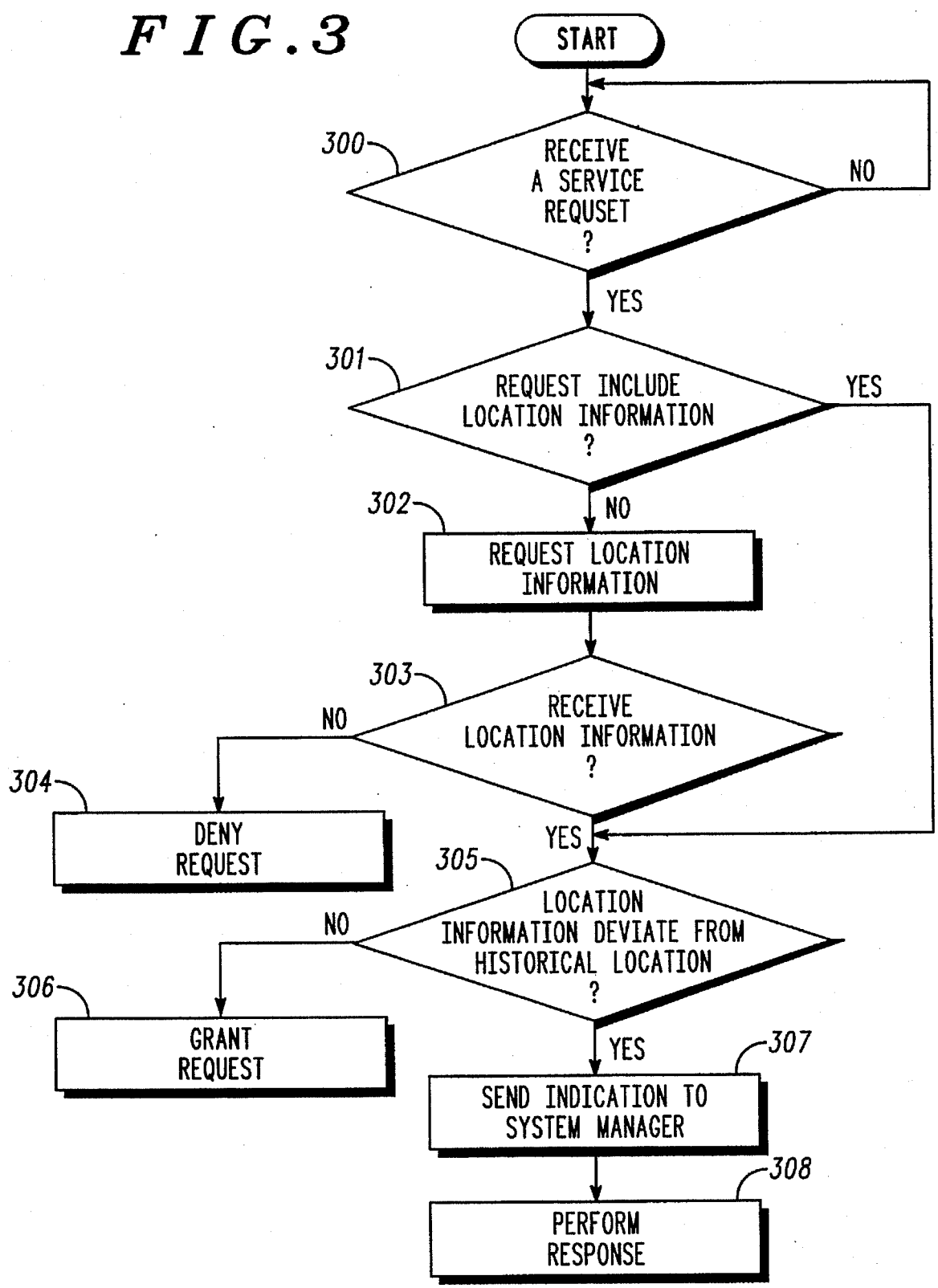

METHOD OF DETECTING UNAUTHORIZED USE OF A COMMUNICATION UNIT

TECHNICAL FIELD OF THE INVENTION

This invention relates generally to wireless communication systems and, in particular, to a method for detecting unauthorized use of a communication unit in a wireless communication system.

BACKGROUND OF THE INVENTION

Wireless communication systems are known to include a communication resource controller, a plurality of communication units, and communication resources. In such communication systems, the communication units communicate with each other via a communication resource, where a communication resource may be an RF channel, a pair of RF channels, a TDM slot, or any medium for carrying RF signals. When a communication unit first "powers up", it must affiliate with the communication resource controller, i.e., let the controller know that the unit is on. The affiliation process typically involves the communication unit transmitting an affiliation message to the controller via a communication resource dedicated for control information (control channel). The affiliation message includes the communication unit's unique identification code (unique ID) and a request for affiliation. If the unique ID is a valid ID, the affiliation request is granted.

Once affiliated, the communication unit can access the services available on the system, such as a group or private communications. To initiate a communication, the communication unit transmits a communication request to the communication resource controller via the control channel. The communication request includes the identity of the requesting communication unit, the identity of a target communication unit, or units, and a request for a particular service, such as allocation of a communication resource. For example, the request may be for a group call which identifies all the communication units in the same group as the requesting communication unit.

Upon receiving this request, the communication resource controller determines whether the initiating communication unit has a valid unique ID and has been affiliated with the system. If the communication unit's unique ID is valid and the unit is affiliated, the communication resource controller grants the request. Having granted the request, the communication resource controller allocates a communication resource to the requesting communication unit and the target communication units, and then transmits a communication resource allocation message on the control channel.

While the communication resource controller performs a validity check of the communication unit's identity, i.e., the unit's unique ID, the controller does not verify that the communication unit received its unique identification code in an authorized manner. Typically, the unique ID is permanently programmed into the communication unit by the manufacturer prior to delivery of the communication unit. Upon delivery of the communication system, a system manager enters the unique ID of all the communication units purchased for the system into the controller, thus rendering these unique IDs valid. Because the manufacturer permanently programs the unique ID into the communication unit and the system manager programs the controller, it is assumed that a valid unique ID used by a communication unit was authorized by the system manager. Unfortunately, this is not always the case. To illustrate, assume that a communication system "hacker" has knowledge of valid unique IDs for a particular system. The hacker can program these unique IDs into other communication units, such that these communication units have valid unique IDs and thus have access the communication system, however, the unique IDs were obtained in an unauthorized manner. When these "unauthorized" communication units request access to the system, the controller verifies the unique ID and allows access.

As is readily apparent, when unauthorized communication units access a communication system, the authorized communication units suffer. They suffer because communication resources are less readily available and because the unauthorized communication units can interfere with important "authorized" communications. For example, assume that the authorized communication units are operated by a city's police force, thus most communications are important to public safety. Further assume that an "unauthorized" communication unit has received a valid unique ID from a hacker, or has stolen an authorized communication unit, and is interfering with the police communications. The person operating the unauthorized communication unit could send police officers on "wild goose" chases, or say he/she will respond to an emergency call, but doesn't. If this were to happen, disastrous results could occur.

To combat this, several techniques have been developed to detected the use of unauthorized communication units. One such technique determines the geographic separation between successive transmissions using the same unique ID within a give time period. If the geographic separation is excessive for the given time, it is assumed that more than one communication unit is using the same unique ID. Another technique counts the number of times a unique ID is used during a given time period. If the number of request is excessive, it is assumed that more than one communication unit is using the same unique ID. When multiple use is detected, a system manager is notified. The system manager may disable the communication units, thus preventing unauthorized use.

While these techniques work well to detect unauthorized use of unique IDs that have been duplicated, they provide little information as to the unauthorized use of an individually used unique ID. Therefore, a need exists for a method that detects the unauthorized use of an individually used unique ID.

BRIEF DESCRIPTION OF THE DRAWINGS

FIG. 1 illustrates a wireless communication system that supports the present invention.

FIG. 2 illustrates a logic diagram that may be used to implement an affiliate process of the present invention.

FIG. 3 illustrates a logic diagram that may be used to implement a service request process of the present invention.

DETAILED DESCRIPTION OF A PREFERRED EMBODIMENT

Generally, the present invention provides a method for preventing unauthorized use of a communication unit. This is accomplished by determining the location of the communication unit each time it transmits an affiliation request or a service request. Knowing the location of the communication unit, the controller can determine whether the location of the unit fits within a historical location pattern for that unit. If the location does not fit within the pattern, the controller can deny the request or send an indication to the system manager asking the system manager to decide what should be done with this unit. With such a method, unauthorized use of a communication unit can be detected and the unauthorized communication unit can be denied access to the system.

The present invention can be more fully described with reference to FIGS. 1–3. FIG. 1 illustrates a wireless communication system 100 that includes a communication resource controller (or central controller) 101, a plurality of communication units 102, communication resources 103, repeaters 104–108, a database 109, and a system manager 110. For a communication unit 102 to access the wireless communication system 100, it must first register, or affiliate, with the central controller 101. This can be done by transmitting an affiliation message to the controller 101, wherein the message includes the unique ID of the communication unit, a request for affiliation, and location which may be determined by a location receiver 111, such as a GPS receiver. Upon receiving the message, the controller 101 accesses the database 109 to determine if the unit's unique ID is a valid ID. A valid ID is one that has been entered into the database 109 by the system manager 110. The central controller 101 also determines whether the location of the unit fits within, or does not deviate from, a historical location pattern contained in the database 109. If the unit's location is within the historical location pattern and the unique ID is valid, the central controller 101 grants the unit's affiliation request.

The historical location pattern is typically a set of geographic coordinates stored in the database 109 that defines a communication unit's normal geographic location during operation. For example, assume that a communication unit is operated by a police officer. Further assume that this police officer's beat is generally known to be a particular part of the city. With this information, the historical location pattern can be established as the police officer's beat. The historical location pattern may also be established by monitoring the location of the communication unit each time the unit requests a service. After only a few requests, a pattern will begin to develop, such that a general geographic area can be defined. While the above discuss two possible ways of establishing the historical location pattern, it should be obvious to one of skill in the art that the historical location pattern may be established in a variety of ways that link a geographic area to a unit's use.

In addition to using the historical location pattern to determine whether the unit 102 should be affiliated, the central controller 101 can also use this information to determine whether a service request should be granted. As with the affiliation request, the communication unit transmits a request that includes its unique ID, its location, and a service request. If the unique ID is valid and the location is within the historical location pattern, the service request will be granted.

To further illustrate, consider the logic diagrams of FIGS. 2 and 3. FIG. 2 illustrates a logic diagram that may be used by the central controller 101 to process an affiliation request. At step 200, the central controller determines whether it has received an affiliation request. Once an affiliation request is received 200, the central controller determines whether the request includes location information for the requesting communication unit 201. It is contemplated by the present invention that most of the communication units will be equipped with a location receiver. Thus, obtaining the location information, which includes the geographic coordinates of the unit's location, should be a rather simple task. If the request did not contain the location information 201, the central controller requests the information from the communication unit 202. This can be done by simply sending an outbound signaling word (OSW) to the unit asking for its location.

After sending the location request 202, the central controller waits for a predetermined period of time (typically less than 5 seconds) for the unit to respond with its location information 203. If the central controller does not receiver the requested information within the time allowed 203, the affiliation request is denied and the system manager is alerted to the potential unauthorized communication unit 204. As mentioned above, it is contemplated that most, if not all, of the communication units will include a location receiver, thus if location information is not received, it is assumed that the unit was incapable of generating the information, i.e., does not include a location receiver, thus it cannot be an authorized communication unit. Note that the system manager may instruct the central controller to process the request even if location information was not received. This may be the case if the system is supporting older communication units, i.e., ones without a location receiver. But in any event, the system manager is alerted to the fact that a communication unit is not conforming to the established protocol which allows the system manager to make a judgment call as to how to proceed. In prior art systems, the system manager was not made aware of the potential unauthorized use, and thus could not exercise the authority of a system manager.

If the location information has been obtained, the central controller determines whether the location information has deviated from a historical pattern 205. This may simply be a determination that the unit is located within the geographic coordinates that define the historical location pattern or within a given tolerance area. It may also be based on a pattern of use. For example, if the unit places about 80% of its calls within the geographic coordinates of the historical pattern, while the remaining 20% are placed anywhere within the coverage area of the system. Thus, if the unit's most recent requests deviate from this 80/20 relationship, to say a 60/40 relationship, the central controller flags this as a deviation. If the unit has not deviated from its historical location pattern, the central controller grants the affiliation request 206.

If, however, the location information has deviated from the historical location pattern 205, the central controller sends an indication to the system manager 207. The indication identifies the unit that has the deviation and may also include the degree of deviation; for example, a mile out of its normal area; previous affiliation problems for this unit, previous service request problems, new affiliation request, etc. Note that for the previous information, the database would need to be updated to include this information. Having informed the system manager, the central controller waits for a response. Upon receiving the response, the central controller performs the response 208. The response from the system manager may be to deny the request, grant the request, reprogram the unit into a default communication group, disable the unit, or reprogram the unit with a minimal set of system access features.

FIG. 3 illustrates a logic diagram that may be used by the central controller 101 to process a service request. At step 300, the central controller determines whether it has received a service request. Once a service request is received 300, the central controller determines whether the request includes location information for the requesting communication unit 301. If the request did not contain the location information 301, the central controller requests the information from the communication unit 302. This can be done by simply sending an outbound signaling word (OSW) to the unit asking for its location.

After sending the location request 302, the central controller waits for a predetermined period of time (typically less than 5 seconds) for the unit to respond with its location information 303. If the central controller does not receiver the requested information within the time allowed 303, the service request is denied and the system manager is alerted to the potential unauthorized communication unit 304. As mentioned above, it is contemplated that most, if not all, of the communication units will include a location receiver, thus if location information is not received, it is assumed that the unit was incapable of generating the information, i.e., does not include a location receiver, thus it cannot be an authorized communication unit. Note that the system manager may instruct the central controller to process the request even if location information was not received. This may be the case if the system is supporting older communication units, i.e., ones without a location receiver. But in any event, the system manager is alerted to the fact that a communication unit is not conforming to the established protocol which allows the system manager to make a judgment call as to how to proceed. In prior art systems, the system manager was not made aware of the potential unauthorized use and thus could not exercise the authority of a system manager.

If the location information has been obtained, the central controller determines whether the location information has deviated from a historical pattern 305. As mentioned above, this may simply be a determination that the unit is located within the geographic coordinates that define the historical location pattern or within a given tolerance area. It may also be based on a pattern of use. For example, the unit places about 80% of its calls within the geographic coordinates of the historical pattern, but the remaining 20% are placed anywhere within the coverage area of the system. Thus, if the units most recent requests deviate from this 80/20 relationship, to say a 60/40 relationship, the central controller flags this as a deviation. If the unit has not deviated from its historical location pattern, the central controller grants the service request 306.

If, however, the location information has deviated from the historical location pattern 305, the central controller sends an indication to the system manager 307. The indication identifies the unit that has the deviation and may also include the degree of deviation; for example, a mile out of its normal area; previous affiliation problems for this unit, previous service request problems, new affiliation request, etc. Note that for the previous information, the database would need to be updated to include this information. Having informed the system manager, the central controller waits for a response. Upon receiving the response, the central controller performs the response 308. The response from the system manager may be to deny the request, grant the request, reprogram the unit into a default communication group, disable the unit, or reprogram the unit with a minimal set of system access features.

As a working example of the above, assume that a communication unit is operated by a police officer and his/her historical location pattern is established by his/her beat and that 10% of requests are made outside of the beat area. During the officer's normal day, most of the communication unit's transmissions are initiated within the beat area, thus fitting, or not deviating from, the historical location pattern. Later that day, a communication is initiated by the officer's communication unit in an area a great distance from the beat area. The central would flag this as a possible unauthorized use due to the degree of deviation and inform the system manager. The system manager would then have the ability to decide how to handle this request and subsequent requests. If the system manager knows that the officer is responding to a police emergency in that area, the system manager can inform the central controller to process the request normally. Alternatively, the system manager could determine that the communication unit was stolen, or another communication unit has been programmed with the unique ID of the police officer's communication unit, thus allowing the system manager to take appropriate action.

The present invention provides a method for detecting the unauthorized use of a communication unit. With such a method, communication units that do not fit within a historical location pattern will be identified as potential unauthorized communication units. Having flagged these units, a system manager can determine whether these units have been stolen or have been illegally programmed with a valid unique communication unit ID and decide how to proceed with such units. In prior art systems, the individual unauthorized use of valid ID was not detectable.

We claim:

1. In a wireless communication system, a method for detecting unauthorized use of a communication unit, the method comprising the steps of:

a) transmitting, by the communication unit, an affiliation message to a central controller via the wireless communication system;

b) determining, by the central controller, whether a location information is included in the affiliation message;

c) when the location message is not included in the affiliation message, transmitting, by the central controller, a request for the location information to the communication unit via the wireless communication system;

d) determining, by the central controller, whether the location information of the communication unit deviates from a historical location pattern of the communication unit; and e) when the location information deviates from the historical location pattern, indicating, by the central controller, that the communication unit is a potential unauthorized communication unit.

2. The method of claim 1 further comprises sending, by the central controller, an indication to system manager, wherein the indication indicates that the communication unit has deviated from its historical location pattern.

3. The method of claim 1 further comprises requesting, by the central controller, input from a system manager as to whether the communication unit will be affiliated with the wireless communication system.

4. The method of claim 3 further comprises executing, by the central controller, the input from the system manager.

5. In a wireless communication system, a method for detecting unauthorized use of a communication unit, the method comprising the steps of:

a) transmitting, by the communication unit, a service request message to a central controller via the wireless communication system;

b) determining, by the central controller, whether a location information is included in the service request message;

c) when the location information is not included in the service request message, transmitting, by the central controller, a request for the location information to the communication unit via the wireless communication system;

d) determining, by the central controller, whether the location information of the communication unit deviates from a historical location pattern of the communication unit; and e) when the location information deviates from the historical location pattern, indicating, by the central controller, that the communication unit is a potential unauthorized communication unit.

6. The method of claim 5, step (d) further comprises transmitting a service request grant on a control channel when the location information does not deviate from the historical location pattern.

7. The method of claim 5 further comprises denying the service request when affiliation of the communication unit deviated from the historical location pattern.

8. The method of claim 5 further comprises sending, by the central controller, an indication to a system manager, wherein the indication indicates that the communication unit has deviated from its historical location pattern.

9. In a wireless communication system, a method for detecting unauthorized use of a communication unit, the method comprising the steps of:

at turn-on of the communication unit:
 a) transmitting, by the communication unit, an affiliation message to a central controller via the wireless communication system;
 b) determining, by the central controller, whether a location information is included in the affiliation message;
 c) when the location message is not included in the affiliation message, transmitting, by the central controller, a request for the location information to the communication unit via the wireless communication system;
 d) determining, by the central controller, whether the location information of the communication unit deviates from a historical location pattern of the communication unit;
 e) when the location information deviates from the historical location pattern, indicating, by the central controller, that the communication unit is a potential unauthorized communication unit;

during operation of the communication unit:
 f) transmitting, by the communication unit, a service request message to the central controller via the wireless communication system;
 g) determining, by the central controller, whether another location information is included in the service request message;
 h) when the location message is not included in the service request message, transmitting, by the central controller, another request for the location information to the communication unit via the wireless communication system;
 i) determining, by the central controller, whether the location information of the communication unit deviates from the historical location pattern of the communication unit; and
 j) when the location information deviates from the historical location pattern, indicating, by the central controller, that the communication unit is another potential unauthorized communication unit.

* * * * *

UNITED STATES PATENT AND TRADEMARK OFFICE
CERTIFICATE OF CORRECTION

PATENT NO. : 5,535,431
DATED : July 9, 1996
INVENTOR(S) : Gary W. Grube, Timothy W. Markison It is certified that error appears in the above-indentified patent and that said Letters Patent is hereby corrected as shown below:

Col. 6 claim 5, line 62 --whether a location-- should be --whether location--

Signed and Sealed this

Thirty-first Day of December, 1996

Attest:

BRUCE LEHMAN

Attesting Officer        Commissioner of Patents and Trademarks